2,889,368

PROCESS FOR THE ACID DECOMPOSITION OF ORGANIC HYDROPEROXIDES

Kizo Hiratsuka, Oiso-machi, Naka-gun, Kanagawa-ken, Eiichi Yonemitsu and Takashi Itabashi, Tokyo, Kazuo Ishikawa, Shinohara-cho, Kohoku-ku, Yokohama, and Shigehiro Date and Katsutaro Keimatsu, Tokyo, Japan No Drawing. Application June 18, 1957
Serial No. 666,491

Claims priority, application Japan June 22, 1956

3 Claims. (Cl. 260—593)

This invention relates to improvements in or relating to the acid decomposition of organic hydroperoxides, more particularly to the simultaneous production of phenols and carbonyl compounds by the acid decomposition of hydroperoxides, preferably obtained by the oxidation by means of molecular oxygen or air of alkyl-aromatic compounds and their derivatives.

It is already known that oxidation products may be decomposed in the presence of various acidic substances. For example cumene hydroperoxide is decomposed in the presence of a 10 to 70% aqueous sulphuric acid solution at a temperature between about 50 and 100° C. to phenol and acetone, the yields amounting to 80–90%. U.S. Patent No. 2,663,735 sets forth that cumene hydroperoxide is decomposed in the presence of an acetone solution of sulphuric acid at 50–60° C. to phenol and acetone, the yields being claimed to lie between 92 and 96%. The process of decomposition in the presence of an aqueous sulphuric acid solution, is, however, carried out in an heterogeneous phase, so that the reaction velocity is relatively slow, resulting in comparatively low yields. The process as set forth in U.S. Patent No. 2,663,735 is a decomposition with a homogeneous reaction having a higher speed. However in this case, the sulphuric acid is employed as high as about 5% relative to the material hydroperoxide, so that undesirable sulfonation or polymerization may occur. U.S. Patent No. 2,737,527 sets forth the use of perchloric acid as a catalyser. According to further experiments, it has been found that perchloric acid is most superior. In the case of this acid, the reaction velocity is amazingly higher than that obtainable with the use of sulphuric acid.

It has now been found, according to this invention, that as a catalyser for the decomposition of hydroperoxides, trichloromethanesulfonic acid can be substituted for perchloric acid with even better results.

When, according to the results of our experiments T.C.M.S. acid is used as the catalyst, the quantity of the latter required for the decomposition may be smaller than that in the case of any other conventional method, the reaction temperature is comparatively lower, and phenols and carbonyl compounds can be obtained with higher yields, compared with known methods. Hydroperoxides are decomposed by keeping them in contact with T.C.M.S. acid at a normal or an elevated temperature in the presence of, or not in the presence of decomposition products to produce phenols and carbonyl compounds.

In the process according to this invention, hydroperoxides and T.C.M.S. acid are used either in their pure state in substance, or alternatively, in the state of solutions in appropriate inert solvents, respectively. In most cases, however, hydroperoxides are preferably used in the form of mixtures with benzene derivatives, from which the hydroperoxides were prepared. T.C.M.S. acid may be used in the form of crystals, but the form of solutions is more preferable, especially in the case of continuous operation.

For the last mentioned purpose, any solvent which dissolves T.C.M.S. acid, for instance, water, acetic acid, phenol, acetone and the decomposition products of the hydroperoxides, or a mixture of benzene derivatives, which are the starting materials for the oxidation, with one of above mentioned substances, or a mixture of several kinds of above mentioned substances, may be used. The process according to this invention is applied most suitably to the decomposition of the hydroperoxides of isopropyl benzene and its homologues, and of alkyl-aromatic compounds or their derivatives, in which one of the alkyl groups contains a secondary or tertiary carbon atom, for instance, isopropyl benzene, secondary butyl benzene meta- or para di-isopropyl benzene.

In carrying out the process according to this invention, T.C.M.S. acid, either in the form of crystals, or a solution in any of aforementioned solvents is brought into contact with one of said hydroperoxides of alkyl-aromatic compounds, in a vessel kept at a proper temperature for the decomposition. In this case, the hydroperoxide is not necessarily employed in pure state, but may contain an alkyl-aromatic compound, which is the starting material for the preparation of the hydroperoxide.

The reaction temperature depends upon the concentration of the hydroperoxide to be decomposed, the kind and the quantity of the impurities involved, the quantity of the acid used, as well as upon the quantity and kind of the solvent or the solvents to dissolve the acid, and may vary from about 0° C. to 110° C.

When T.C.M.S. acid is employed, for instance, in the form of an aqueous solution, the decomposition temperature depends mainly upon the concentration. Generally speaking, the higher the concentration, the lower the reaction temperature is selected. With a 10% aqueous solution of the acid, for instance, the decomposition is carried out at about 100° C., while with a 50% aqueous solution the reaction temperature is controlled at about 60° C.

As above mentioned, T.C.M.S. acid is used in the form of crystals. As an example, 20% cumene hydroperoxide in cumene is decomposed in crystalline T.C.M.S. acid, at a temperature preferably between 35 and 45° C., while in the case of the continuous decomposition with the acid in a dissolved state, somewhat higher temperature is necessary, say 70° C., in this case.

A too high temperature, if employed, may cause the condensation of carbonyl compounds, such as acetone, and will lead to inferior yields of the decomposition products.

The quantity of T.C.M.S. acid required as catalyst for the decomposition of hydroperoxides is very small, and in the case, for instance, of the material as above containing 20% hydroperoxide, it varies normally from 0.01 to 0.04%, these values being still smaller than those commonly used in the known process employing perchloric acid.

More quantity of the catalyst than above specified may be used. However, the decomposing agent must be, after all, neutralized and removed, so that too much catalyst will adversely affect the economy of the reaction. Furthermore, as the decomposition is an exothermic reaction, so that the more the catalyst is introduced into the process, the more rapidly the reaction goes on, the removing of the reaction heat becomes more difficult, which results in an acceleration of side reactions by thus increased temperature, and naturally in reduced yields of the main products.

The main features of the novel process are:

(1) The decomposition is carried out in an economical manner, because of a small quantity of the catalyst employed.

(2) On account of small quantities of by-products, the yields of the main products are nearly quantitative and higher than, or at least equal to those obtainable in known processes.

(3) When the process is carried out with the catalyst in the form of crystals, that is, in the non-aqueous condition, the after-treatment to isolate the main products becomes very easy.

The following examples, in which the parts and the percentages are given by weight, are illustrative of this invention. In these Examples 1–7, the employed hydroperoxides were oxidation products of the corresponding alkyl benzene at a temperature between about 100 and 120° C. and in the liquid phase by means of molecular oxygen, and contained $\alpha,\alpha$-dimethyl phenyl carbinol, acetone and the like. While in the remaining Examples 8 and 9, pure hydroperoxide in solutions in cumene and not containing said inpurities was employed as the starting material, resulting in lower decomposition temperatures.

Example 1

0.28 part of trichlorosulfonic acid of crystalline form were introduced in a reaction vessel provided with an agitator, a reflux condenser, and a cooler. Then, 633 parts of a 90% solution of hydroperoxide in cumene were added by drops thereto at a temperature between 20 and 30° C. under cooling and agitation. After dropping, the reaction mixture is still further agitated for a little while to complete the decomposition, until the hydroperoxide amounted to less than 0.05%.

Then, the products were neutralized by addition of sodium carbonate. The resultant acetone was separated by distillation, and the phenol was extracted by means of 10% caustic soda solution. The yields of the acetone and the phenol were each 94% relative to cumene hydroperoxide employed as the starting material.

Example 2

0.18 part of trichloromethanesulfonic acid were dissolved in 4 parts of the decomposition products obtained in the preceding Example 1 and introduced in a reaction vessel similar to that employed in that example. Then, 600 parts of a 90% solution of hydroperoxide in cumene were added by drops thereto, the decomposition temperature being kept carefully between 35–45° C. The yields of the acetone and the phenol amounted to 94% and 98%, respectively.

Example 3

In the same reaction vessel above referred to, 1.5 parts of trichloromethanesulfonic acid in crystalline form were brought into contact with 1,500 parts of a 20.4% solution of hydroperoxide in cumene, at a temperature between 35 and 40° C. The yields of the acetone and the phenol amounted to 100% and 97%, respectively.

Example 4

A 20.4% solution of hydroperoxide in cumene was introduced in a reaction vessel (capacity 3 lit.) provided with agitator, reflux condenser, material inlet, catalyser inlet and products outlet, at a rate of 3,000 cc. per hour, while 10 parts of a solution of trichloromethanesulfonic acid were fed per hour thereto, said solution being prepared by dissolving 0.6 part of the acid in the decomposition products obtained in Example 1. The vessel was cooled from outside to remove the reaction heat, the inside temperature being kept at about 70° C. The decomposition was completed within 30 minutes. The yields of the acetone and the phenol were 98.6% and 96.7%, respectively.

Example 5

In the reaction vessel described in Example 1, 1,212 parts of secondary butyl benzene containing 21.8% of the hydroperoxide were decomposed at 60° C. in the presence of 0.2 part of trichloromethanesulfonic acid of crystalline form. Thus, methyl ethyl ketone 97.4 parts and phenol 133 parts were obtained, corresponding the yields of 85.0% and 89.1%, respectively.

Example 6

200 parts of a 75.8% solution of hydroperoxide in cumene were decomposed in a reaction vessel as explained in Example 1 at the boiling point in the presence of trichloromethanesulfonic acid in the form of a 10% aqueous solution, 100 parts. The yields of the phenol and the acetone were 96% and 95%, respectively.

Example 7

10 parts of a 50% aqueous solution of trichloromethanesulfonic acid were introduced in a reaction vessel as explained in Example 1 and decomposed by adding slowly by drops 150 parts of a 20.4% solution of hydroperoxide in cumene, the temperature being carefully maintained between 60 and 65° C. The yields of the phenol and the acetone amounted to 96% and 97%, respectively.

Example 8

1,000 parts of a 20.7% solution of the pure hydroperoxide in cumene were added by drops to 1 part of crystalline trichloromethanesulfonic acid, the temperature being kept carefully between 0 and 10° C. The yields of the phenol and the acetone thus obtained by the decomposition, amounted to 99.7% and 98%, respectively.

Example 9

1,000 parts of a 75.4% solution of the pure hydroperoxide in cumene were added by drops to 1 part of crystalline trichloromethanesulfonic acid, the temperature being maintained carefully between 60 and 65° C. The yields of the phenol and the acetone thus obtained by the decomposition, amounted to 99.8% and 97%, respectively.

Although the invention has been described in considerable detail in the foregoing for the purpose of illustration, it is to be understood that such detail is solely for this purpose and that variations can be made therein by those skilled in the art without departing from the spirit and scope of the invention except as set forth in the appended claims.

Having thus described the invention, what is claimed as new and desired to be secured by Letters Patent is:

1. Process for the production of phenol, its homologues and carbonyl compounds by decomposing hydroperoxides of aromatic alkyl compounds selected from the group consisting of isopropyl benzene hydroperoxide and secondary butyl benzene hydroperoxide, said process comprising the steps of charging a starting material in the form of a solution in an inert solvent, introducing as catalyst trichloromethanesulfonic acid in the form of a solution in a solvent, and keeping the decomposition temperature between about 0 and 110° C. at a substantially normal pressure.

2. Process for the production of phenol, its homologues and carbonyl compounds by decomposing hydroperoxides of aromatic alkyl compounds selected from the group consisting of isopropyl benzene hydroperoxide and secondary butyl benzene hydroperoxide, said process comprising the steps of charging a starting material in the form of a solution in an inert solvent in a reaction vessel, introducing as catalyst trichloromethanesulfonic acid crystals, maintaining the decomposition temperature between about 0 and 110° C. at a substantially normal pressure with the ratio of the catalyst to the starting material being between 0.01% to 0.04%.

3. The process of production of phenol and acetone by decomposing cumene hydroperoxide, comprising the steps of introducing trichloromethanesulfonic acid crystals into a reaction vessel, further introducing by drops cumene comprising substantially the hydroperoxide at a temperature between 10 and 50° C. and at a substantially normal pressure, neutralizing said trichloromethanesulfonic acid, separating acetone thus formed by distillation, and finally adding a caustic soda solution to extract phenol thus formed.

References Cited in the file of this patent
UNITED STATES PATENTS

| | | |
|---|---|---|
| 2,683,751 | Filar | July 13, 1954 |
| 2,728,796 | Vandenberg | Dec. 27, 1955 |